(12) United States Patent
Rigaud et al.

(10) Patent No.: US 8,459,044 B2
(45) Date of Patent: Jun. 11, 2013

(54) THERMOCHEMICAL REACTOR FOR A COOLING AND/OR HEATING APPARATUS

(75) Inventors: Laurent Rigaud, Saleilles (FR); Francis Kindbeiter, Corneilla del Vercol (FR)

(73) Assignee: Coldway, Pia (FR)

( * ) Notice: Subject to any disclaimer, the term of this patent is extended or adjusted under 35 U.S.C. 154(b) by 1239 days.

(21) Appl. No.: 12/065,139

(22) PCT Filed: Aug. 31, 2005

(86) PCT No.: PCT/FR2005/050696
§ 371 (c)(1),
(2), (4) Date: Feb. 28, 2008

(87) PCT Pub. No.: WO2007/026056
PCT Pub. Date: Mar. 8, 2007

(65) Prior Publication Data
US 2008/0199372 A1    Aug. 21, 2008

(51) Int. Cl.
*F25D 5/00*    (2006.01)
*F25B 17/08*    (2006.01)
*A62B 7/08*    (2006.01)

(52) U.S. Cl.
USPC .................................. 62/4; 62/480; 422/221

(58) Field of Classification Search
USPC .......................... 62/4, 480; 422/221, 223, 236
See application file for complete search history.

(56) References Cited

U.S. PATENT DOCUMENTS

| | | | |
|---|---|---|---|
| 2,050,959 A | | 8/1936 | Normelli |
| 2,649,700 A | * | 8/1953 | Piper ................................ 62/480 |
| 4,541,851 A | * | 9/1985 | Bosquain et al. ................ 96/126 |
| 4,716,278 A | * | 12/1987 | Cappe et al. .................... 219/521 |
| 4,801,308 A | * | 1/1989 | Keefer ................................ 95/96 |
| 4,881,958 A | * | 11/1989 | Eckardt et al. .................... 96/127 |
| 5,661,986 A | * | 9/1997 | Labranque ....................... 62/480 |
| 5,716,427 A | * | 2/1998 | Andreani et al. .................. 95/90 |
| 5,827,485 A | * | 10/1998 | Libal et al. ...................... 422/179 |
| 6,086,659 A | * | 7/2000 | Tentarelli ........................ 96/131 |
| 6,790,415 B2 | * | 9/2004 | Petit et al. ...................... 422/619 |
| 7,311,763 B2 | * | 12/2007 | Neary .............................. 96/121 |
| 2004/0231823 A1 | | 11/2004 | Tsuji |
| 2006/0022068 A1 | * | 2/2006 | Soria et al. .................... 239/462 |

FOREIGN PATENT DOCUMENTS

| EP | 0 307 298 A | 3/1989 |
|---|---|---|
| EP | 1 621 828 A | 2/2006 |

(Continued)

OTHER PUBLICATIONS

International Search Report of PCT/FR2005/050696, May 30, 2006.

*Primary Examiner* — Frantz Jules
*Assistant Examiner* — Webeshet Mengesha
(74) *Attorney, Agent, or Firm* — Westerman, Hattori, Daniels & Adrian, LLP

(57) ABSTRACT

A thermochemical reactor (1) for a cooling and/or heating includes at least one reagent unit (2) which, using chemical combination, can absorb a gas stream originating from a tank and which, using the reverse chemical reaction, can desorb the gas stream due to a rise in temperature. The reagent unit (2) is disposed in a container (3) that has walls, at least some of which are equipped with diffusers (7) for distributing the gas stream. In addition, the reagent unit (2), which can be heated, is of the type that can expand during absorption of the gas stream and retract during desorption of the gas stream. Moreover, at least some of the walls are mobile walls, which can accompany the longitudinal movement of the reagent unit (2), to enable successive deformation phenomena.

10 Claims, 2 Drawing Sheets

FOREIGN PATENT DOCUMENTS

| | | |
|---|---|---|
| FR | 2 703 763 A | 10/1994 |
| FR | 2 723 438 A | 2/1996 |
| FR | 2 843 705 A | 2/2004 |
| JP | 2000-146353 A | 5/2000 |
| JP | 2000-179978 * | 6/2000 |
| WO | 94/11685 A | 5/1994 |

* cited by examiner

THERMOCHEMICAL REACTOR FOR A COOLING AND/OR HEATING APPARATUS

BACKGROUND OF THE INVENTION (1). Field of the Invention

The present invention relates to a thermochemical reactor for a cooling and/or heating apparatus including at least one reagent unit capable of absorbing, by chemical combination, a gas flow coming from a tank and of desorbing this gas flow by reverse chemical reaction, under the action of a rise in temperature, so that it reintegrates into said tank, said reagent unit being arranged in a container connected to said tank through a pipe, and having walls, at least some of which include diffuser means permitting to distribute the gas flow in one direction or in the other one between the reagent unit and the tank, said reagent unit being of the type capable of expanding during the absorption of the gas flow and of retracting during the desorption of the gas flow and being connected to heating means.

The invention also relates to a cooling and/or heating apparatus including such a thermochemical reactor as well as an isothermal device provided, in turn, with said cooling and/or heating apparatus.

The present invention more specifically relates to the field of the production of cold and/or heat from thermochemical systems.

(2). Description of the Prior Art

In a known way, such systems are based on heat transfers resulting from a chemical reaction between a gas, such as ammonia, and reactive salts, such as calcium chlorides, contained respectively in two tanks separated by a valve. When the latter opens, a chemical reaction occurs, during which the gas vaporizes, in order to join the salts. This evaporation is heat-consuming and therefore generates a production of cold at the level of the tank containing the gas. Furthermore, the chemical reaction between the gas and the salts is exothermic and causes heat to be released at the level of the salt tank.

After complete evaporation of the gas, or when the salts are saturated, the chemical reaction stops as well as the production of cold and heat. It is then possible to regenerate the system, simply by heating the reactive salts, which causes the separation of the salts and the gas which then returns to its original tank where it is again condensed. After regeneration of the reactive salts, a new cooling and/or heating cycle can be performed.

The progressive implementation of these thermochemical systems in an industrial environment has at the same time required the development of suitable apparatuses, having means capable of optimizing, improving and controlling the evolution of the thermochemical reactions, and designed by means of reliable materials capable of withstanding high stresses, namely pressure and temperature stresses.

In this context, many work related to the development of the reactor, i.e. the unit formed by the reactive salts, the envelope in which they are contained and the various means the latter is provided with, with a view to providing a solution in which the reagent is not only capable of absorbing and desorbing a maximum quantity of gas without being carried along by this gas, but also capable of undergoing volume changes in said envelope, without deteriorating same or losing its reactive qualities, even bursting.

Presently, several documents are known, which are dedicated to the description of innovations made in this field.

Thus, FR 2 455 713 for example refers to a thermochemical reactor, which can be formed of several reactive bodies made self-supporting by a binder and contained in a flexible envelope having several envelope elements. Passages provided for between adjacent envelope elements define channels allowing the gas flow to circulate between the various reactive bodies. The reactor also includes distribution structures which communicate with the circulation channels and are designed so as to be adapted to the dimensional changes of an envelope element. These distribution structures can include telescopic elements which can be pushed into each other in order to cause changes in length of said distribution structures.

Such a thermochemical reactor has the disadvantage of a complex structure characterized by a great brittleness.

U.S. Pat. No. 2,649,700 describes a thermochemical reactor including several annular-shaped elementary reagent units confined between an inner wall and a peripheral wall. Porous screens separating the elementary units from each other distribute the gas flow between the lower and higher surfaces of the latter and an inlet and outlet conduit. The elementary units are made out of sintered metal and are thus dimensionally stable, namely as regards the above-mentioned pressure and temperature stresses.

Practice has shown that this embodiment has many disadvantages. Indeed, the metallic nature of the units highly limits the quantity of gas that can be absorbed and is in addition characterized by poor retention of the absorbing particles. This obliges to cause the gas flow to pass too fast through screens acting as filters, which complicate the structure of the unit and make it heavy.

From EP 0 206 875 is also known a reagent unit formed by a mixture of chloride and an foamed carbon derivative, capable of absorbing high quantities of gas per volume of unit, and solving the problem of mass transfer. This solid reagent unit has however a low mechanical strength that tends to quickly be deformed under the action of pressure gradients and volume changes it undergoes, so that its gas retention capability gradually tends to decrease during the cooling-regeneration cycles. Finally, the surfaces of the reagent for the mass exchanges can be deformed so much that they become completely ineffective.

In the solution provided by U.S. Pat. No. 2,384,460, the reactive material is confined between containment walls, in a limited volume, and through same pass perforated gas conduits filled with glass wool aimed at retaining said reactive material. Because of the close confinement, the reactive material maintains the same volume and the same shape, not only during the saturation phase, but also during the successive absorption-desorption cycles.

A quite similar thermochemical reactor device is also provided in EP 0 692 086, which describes namely a thermochemical reactor including a solid reagent unit confined in a container, between containment walls, some of which are pervious to mass exchanges. The characteristic of this reactor is defined by the reagent unit used being likely to undergo changes in volume depending on the quantity of gas absorbed, while the containment walls are capable of ensuring the stability in shape of the unit against the tendency to said changes in volume. Thus, in this document is provided to enclose a solid reagent unit in a container with strictly adapted dimensions, so that this reagent unit maintains its dimensions during the various absorption-desorption cycles, maintains its initial mechanical strength, and avoids its swelling, even its deterioration through bursting.

It could be observed that confining the reagent inside a limited space, as described in particular in the last two documents, although made necessary in order to avoid the deterioration of the system, in particular in order to avoid bursting of the reagent unit, represents an obstacle to an optimal evolution of the expected thermochemical reactions. Indeed, impeding the swelling of the reagent considerably reduces the maximum quantity of gas which can be successively absorbed and desorbed, which has in particular a repercussion on the time of autonomy of the system.

Another known similar device is described in the document FR 2 723 438 and tries to cope with the separation of the solid reagent from the walls of the enclosure, this separation resulting into a loss of the power of the reaction through a drop in the thermal-transfer coefficient. To this end, a fluid is introduced between the reagent and the walls of the enclosure, said fluid bringing about the thermal connection between the reagent and the enclosure. In addition, a fluid-confining device is added inside the enclosure in order to limit the displacement of said fluid and to prevent it from accumulating on top of the reagent.

This device has nevertheless the disadvantage of being of a complex embodiment, using additional means for implementing a fluid and for confining same.

SUMMARY OF THE INVENTION

The object of this invention is thus to provide a new thermochemical reactor, in which the swelling of reagent is not prevented, but nevertheless controlled so that its absorption-desorption capacities are fully used without fearing its deterioration through bursting.

To this end, the invention provides a thermochemical reactor for a cooling and/or heating apparatus comprising at least one reagent unit capable of absorbing, by chemical combination, a gas flow coming from a tank and of desorbing this gas flow by reverse chemical reaction, under the action of a rise in temperature, so that it reintegrates into said tank, said reagent unit being arranged in a container connected to said tank through a pipe, and having walls, at least some of which include diffuser means permitting to distribute the gas flow in one direction or in the other one between the reagent unit and the tank, said reagent unit being of the type capable of expanding during the absorption of the gas flow and of retracting during the desorption of the gas flow and being connected to heating means, wherein at least some of said walls consist of movable walls, capable of following the longitudinal movement performed by the reagent unit during its expansion or its retraction inside said container, so as to enable the successive deformation phenomena by expansion and restoring to the initial shape by retraction of said reagent unit.

According to a preferred embodiment, in the invention said container is also defined by a tube, each end of which is extended by a half-sphere, the diameter of which is such that it substantially allows inserting without backlash the reagent unit, which has, in turn, a cylindrical shape and is sandwiched between two discs capable of sliding longitudinally, should the case arise, towards each half-sphere under the action of the expansion of the reagent unit, or, should the case arise, towards the central zone of the tube under the action of the retraction of the reagent unit.

Furthermore, according to an advantageous feature, the present invention also provides that the diffuser means enabling the distribution of the gas flow in one direction or in the other one between the reagent unit and the tank are defined by a set of several walls imbricated into each other, delimiting centrally a channel, each made out of materials capable of permitting the passing through of the gas flow, said set being capable of being inserted through openings provided for this purpose in said reagent unit and said movable walls, and said set communicating at the level of one of its ends with the pipe connecting the container to the tank.

According to an embodiment of the invention, the thermochemical reactor is provided with heating means defined by a set of heating collars or ribbons positioned outside the container in which the reagent unit is arranged.

On the other hand, this document also refers to a cooling and/or heating apparatus including a thermochemical reactor according to the invention, connected to a gas-fluid tank by means of a pipe provided with a valve, as well as to an isothermal device provided with such a cooling and/or heating apparatus.

The present invention also relates to the features which will become clear during the following description, and which should be considered separately or according to all their possible combinations.

This description relating to exemplary embodiments, given by way of an indication and in a non-restrictive way, will permit to better understand how the invention can be carried out, with reference to the attached drawings.

DETAILED DESCRIPTION OF THE PREFERRED EMBODIMENTS

Figure 1:
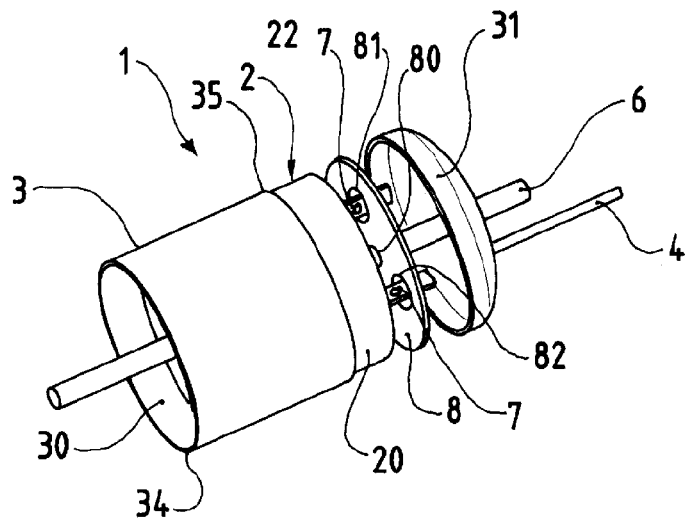
FIG. 1 represents a schematic perspective and exploded view of an embodiment of a thermochemical reactor according to the present invention.
Figure 3:
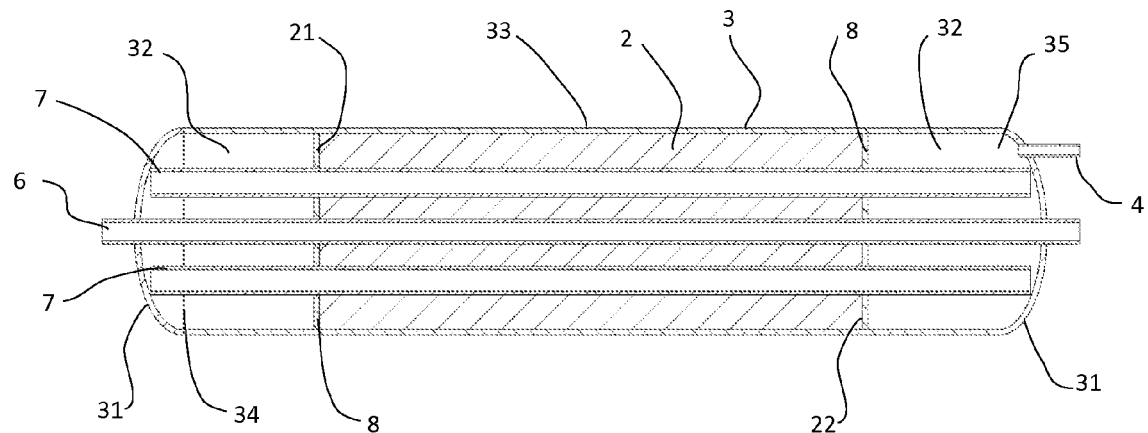
FIGS. 3 and 4 represent schematic longitudinal cross-sectional views of a thermochemical reactor according to the invention, before and after the absorption of gas, respectively.

The thermochemical reactor 1 that can be seen in FIG. 1, relating to a particular embodiment of the invention, is comprised of a solid reagent unit 2, in the form of at least four cylindrical wafers inserted into a container 3 defined by a tube, which is preferably made out of stainless steel and has a diameter adapted to guarantee a close contact between its inner walls 30 and the outer surface 20 of the reagent unit 2 after their assembling. Furthermore, as can be seen in FIG. 3, the reagent unit 2 is slid into the tube defining the container 3 in a centered way, while providing some clearance 32 at each end 34, 35 of said tube.

Each end 34, 35 of the tube defining the container 3 is furthermore closed thanks to closing means 31 having the shape of a half-sphere or a cap (only one of which is schematically shown in FIG. 1), which is fixed through welding, during the manufacture of the reactor 1.

Figure 2:
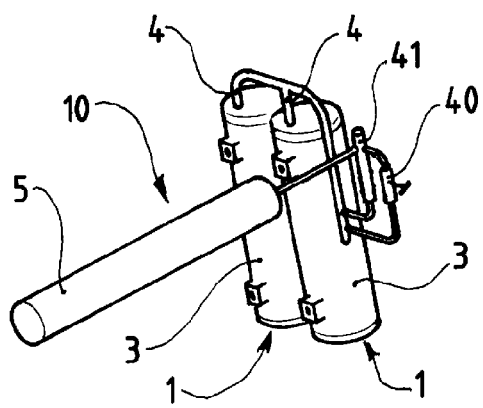
FIG. 2 represents a schematic perspective view of a cooling and/or heating apparatus according to the invention.

The container 3 is connected by means of a pipe 4 provided with a valve 40, and a check and/or non-return valve 41, to a tank 5, visible in FIG. 2, aimed at containing a gas under pressure, for example ammonia.

Preferably, the nature of the reagent unit 2 used in a thermochemical reactor according to the invention is based on the association of two components, namely Expanded Natural Graphite (GNE), which remains inert during the thermochemical reaction, and a reactive salt, such as alkaline, alkaline-earth, or metal salts. It could be shown that such a structure, including GNE, allowed improving the thermochemical performances of the method.

In the exemplary embodiment represented in FIG. 1, the reagent unit 2 is perforated with three openings, not shown, of which one central opening and two openings located on both sides of the latter, aimed at allowing the passing through of diffuser means 7 for enabling the distribution of the gas flow, in one direction or the other one, between the reagent unit 2 and the tank 5, and of a sleeve 6 for accommodating heating means such as a heating resistor, respectively.

One can observe, in this respect, that according to another embodiment, a thermochemical reactor according to the invention could also be provided with heating means defined not by a heating resistor inserted into the reagent unit 2, but by a set of heating collars or ribbons positioned outside said container 3.

The sheath 6 of the heating resistor is conventionally in the form of a stainless steel tube, which passes through the container 3, and is fixed at the level of its two ends to the bottoms of the closing means 31 in the form of half-spheres, while the diffuser means 7, the structure of which, which represents another specificity of this invention, is in the form of an assembly of several pervious walls.

Thus, these diffuser means 7 are more specifically defined by a set of several walls imbricated into each other, delimiting a channel centrally, each made out of materials capable of allowing the passing through of the gas flow, said unit being capable of being inserted through openings as mentioned above, provided for this purpose in said reagent unit 2. Said set of walls communicates at the level of one of its ends with the pipe 4 connecting the container 3 to the tank 5 and conveying the gas flow between these two elements.

In fact, the unit forming the diffuser means 7 includes namely an inner wall defined by a profile bar with a triangular cross-section manufactured after folding a perforated sheet at two points, for example of the R2T4 type, as well as a median wall formed by a stainless steel fabric, the size the meshes of which is preferably between 10 microns and 100 microns, wound around the perforated sheet. Finally, the unit also includes an outer wall, defined by a porous tube of stretched metal, the pore size of which is preferably between 100 microns and 800 microns.

On the other hand, according to the invention, this set of several walls including diffuser means 7 has a length substantially identical to that of the tube forming the container 3, so that each of its ends enters into contact with the bottom of each half-sphere of the closing means 31.

In a known way, the diffuser means 7 play an essential role for the evolution and reproducibility over time of the thermochemical reaction. The structure given to the diffuser means 7 within the framework of this invention has, for this purpose, multiple advantages. Indeed, the perforated sheet prevents the diffusion openings provided for in the reagent unit 2 from clogging, while the stainless-steel fabric is used as a filter capable of retaining in the reagent unit 2 possible grains of salts sucked into the circuit at the opening of the valve 40. In addition, the stretched metal tube prevents the tensions due to the expansion of the reagent unit 2 from passing through the stainless-steel fabric, through the holes in the perforated sheet.

Because of such a structure of the thermochemical reactor 1, the material forming the reagent unit 2 is thus radially confined between the inner wall 30 of the container 3, the wall of sheath 6 and the outer wall of the set of walls including the diffuser means 7.

Advantageously, according to the invention, the reagent unit 2 is furthermore sandwiched between two discs 8 provided with openings 80, 81, 82 for the passing through of the sheath 6 and the diffuser means 7, respectively, these openings 80, 81, 82 being located in front of the openings provided for the same reasons in the reagent unit 2.

According to the invention, these discs 8 advantageously define movable walls capable of sliding longitudinally and following the movement of the reagent unit 2, should the case arise, towards the closing means 31, along the clearance 32, under the action of an expansion of the reagent unit 2 during the production of cold, or towards the central zone 33 of the container 3 under the action of a retraction of the reagent unit 2 during its regeneration.

According to a preferred embodiment, the discs 8 are applied against one of the lower 21 or upper 22 faces, respectively, of the reagent unit, which they are made integral with through adequate means for making integral.

Figure 4:
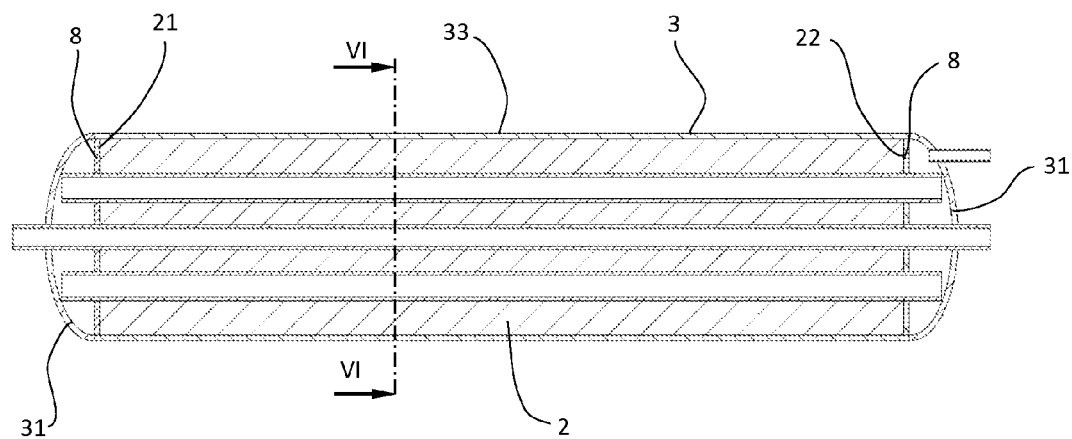
Figure 6:
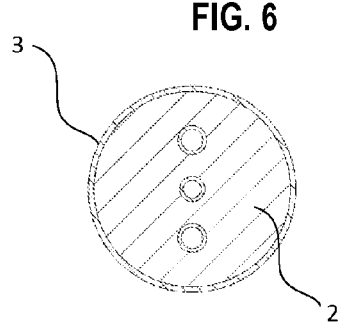
FIG. 6 represents a schematic cross-sectional view of the thermochemical reactor of FIGS. 3 and 4, along the line VI-VI of FIG. 4.

Conventionally, at the opening of the valve 40, the gas maintained under pressure in liquid state within the tank 5 evaporates and is diffused through the diffuser means 7 towards the salts of the reagent unit 2, which fix same, while being capable, according to the invention, of expanding longitudinally, as can be seen when referring to FIGS. 3 and 4. The evaporation of the gas causes the production of cold at the level of the tank 5, whereas the exothermic reaction between the gas and the salts simultaneously leads to a release of heat at the level of the container 3. When the salts of the reagent unit 2 are fully saturated, the heating resistor is connected to the mains, in order to cause a supply of heat and the desorption of the gas, which flows back, through the check valve 41, to the tank 5, where it re-condenses, while the reagent unit 2 retracts to adopt its initial volume.

Permitting the reagent unit 2 to breathe and expand longitudinally along the clearances 32 advantageously allows avoiding the problems of deterioration of the reactor feared with the traditional devices, in particular because this allows avoiding the high pressure stresses the diffuser means 7, which traditionally also act as containment walls, are subjected to.

On the other hand, according to another feature of the invention, the discs 8 have a diameter substantially identical to the inner diameter of the tube defining the container 3, and are thus capable, each, of abutting against the inner wall of said tube at the level of each closing means 31, because of the narrowing of the diameter of the tube at this location, in order to stop the movement performed by the reagent unit 2 during its expansion and to prevent it from entering into contact with the bottom of each closing means 31.

Thus, the presence of the discs 8 advantageously prevents the ends of the diffuser means 7 from being clogged during the expansion of the reagent unit 2.

The invention also relates to a cooling and/or heating apparatus 10, such as for example the one schematically shown in FIG. 2, which includes two thermochemical reactors 1 having the features previously described, each of them being connected to a gas-fluid tank 5 by means of a pipe 4 provided, in turn, with a valve 40 and a check valve 41.

Figure 5:
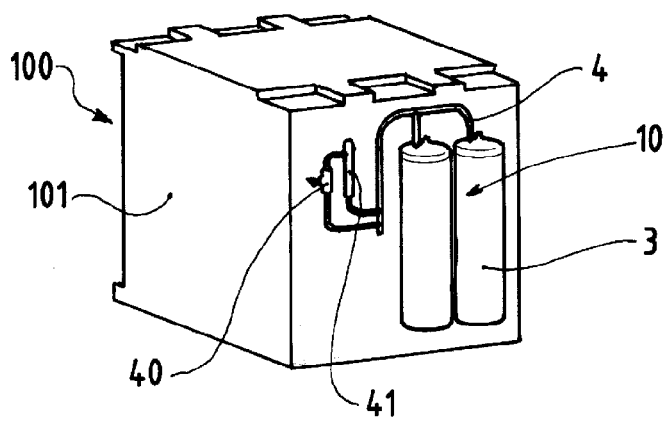
FIG. 5 represents a schematic perspective view of a device provided with the cooling and/or heating apparatus of FIG. 2.

When referring to FIG. 5, such a cooling and/or heating apparatus 10 can be adapted onto an isothermal device 100 having a box 101 aimed at receiving the products to be maintained at temperature and towards the inside of which said tank 5 producing the cold is oriented.

What is claimed:
1. Thermochemical reactor for a cooling and/or heating apparatus comprising:
   a tank for containing a gas,
   at least one reagent unit capable of absorbing, by chemical combination, a gas flow coming from the tank and of desorbing the gas flow by reverse chemical reaction, under the action of a rise in temperature, so that the gas flow reintegrates into said tank, a container connected to said tank through a pipe, said reagent unit being arranged in said container, said container having walls, at least some of which include diffuser means permitting to distribute the gas flow in one direction or in the other one between the reagent unit and the tank, heating means to which said reagent unit is connected, wherein said reagent unit is formed of a material that expands during the absorption of the gas flow and retracts during the desorption of the gas flow, wherein the walls of the container include (i) a tube within which the reagent unit is introduced without radial play in a radial direction of the tube, an outer radial surface of the reagent unit being in close contact with an inner radial surface of the tube in a radial direction of the tube, so that the reagent unit performs movements in a longitudinal direction of the tube during its expansion and its retraction inside said container, and (ii) movable walls between which the reagent unit is sandwiched, wherein each of the movable walls has an internal face oriented transversally with respect to the longitudinal direction of the tube and is movable within the tube along a longitudinal direction of the tube, the respective internal faces of the movable walls being applied against and integral with respective opposite end faces of the reagent unit in a longitudinal direction of the tube, so that the movable walls move in the longitudinal direction of the tube following the movements performed by the reagent unit in the longitudinal direction of the tube during its expansion and its retraction inside said container, so as to enable the successive deformation phenomena by expansion and restoring to the initial shape by retraction of said reagent unit.

2. Reactor according to claim 1, wherein the container is defined by the tube, each end of which is extended by closing means in the form of at least one half-sphere and the diameter of which is such that the tube allows inserting substantially without backlash the reagent unit, which has, in turn, a cylindrical shape and is sandwiched between the movable walls defined by two discs capable of sliding longitudinally, should the case arise, towards each closing means under the action of the expansion of the reagent unit, or, should the case arise, towards the central zone of the tube under the action of the retraction of the reagent unit.

3. Reactor according to claim 2, wherein the discs have a diameter identical to the inner diameter of the tube defining the container, and are thus capable, each, of abutting against the inner wall of one of the closing means, in order to stop the movement performed by the reagent unit during expansion of the reagent unit and to prevent the reagent unit from entering into contact with the bottom of each closing means.

4. Reactor according to claim 2, wherein the discs are applied against one of lower or upper faces, respectively, of the reagent unit.

5. Reactor according to claim 1, wherein the diffuser means enabling the distribution of the gas flow in one direction or in the other one between the reagent unit and the tank are defined by a set of several walls imbricated into each other, delimiting centrally a channel, each made out of materials capable of permitting the passing through of the gas flow, said set being capable of being inserted through openings provided for this purpose in said reagent unit and said movable walls, and said set communicating at the level of one of its ends with the pipe connecting the container to the tank.

6. Reactor according to claim 5, wherein a set of several walls has a length identical to that of the tube defining the container, so that each of ends of said set enters into contact with the bottom of each of the closing means.

7. Reactor according to claim 1, wherein the heating means are defined by a set of heating collars or ribbons positioned outside the container.

8. Cooling and/or heating apparatus comprising a thermochemical reactor according to claim 1 connected to a gas-fluid tank by means of a pipe provided with a valve.

9. Isothermal device equipped with a cooling and/or heating apparatus according to claim 8.

10. Reactor according to claim 1, wherein the mobile walls are entirely within the tube.

* * * * *